United States Patent [19]  [11]  4,247,525
Voeste  [45]  Jan. 27, 1981

[54] METHOD OF AND APPARATUS FOR REMOVING SULFUR OXIDES FROM EXHAUST GASES FORMED BY COMBUSTION

[75] Inventor: Theodor Voeste, Frankfurt am Main, Fed. Rep. of Germany

[73] Assignee: Metallgesellschaft Aktiengesellschaft, Frankfurt am Main, Fed. Rep. of Germany

[21] Appl. No.: 36,683

[22] Filed: May 7, 1979

[30] Foreign Application Priority Data

May 10, 1978 [DE] Fed. Rep. of Germany ....... 2820357

[51] Int. Cl.$^3$ ............................................. C01B 17/00
[52] U.S. Cl. .................................. 423/242; 423/166; 423/421; 423/422
[58] Field of Search .......... 423/242 A, 242 R, 244 A, 423/244 R, 166, 552, 421, 422

[56] References Cited

U.S. PATENT DOCUMENTS

| | | | |
|---|---|---|---|
| 2,683,649 | 7/1954 | Hirsch | 423/552 |
| 3,792,153 | 2/1974 | Lynn et al. | 423/421 |
| 3,932,587 | 1/1976 | Grantham et al. | 423/242 A |
| 4,120,737 | 10/1978 | Berrie et al. | 423/166 |

FOREIGN PATENT DOCUMENTS 826221 12/1969 United Kingdom .

Primary Examiner—Earl C. Thomas
Assistant Examiner—Gregory A. Heller
Attorney, Agent, or Firm—Karl F. Ross

[57] ABSTRACT

A process for removing sulfur oxides from exhaust gas formed by combustion particularly exhaust gas from an electricity-generating power plant. The exhaust gas flows through a reaction zone which operates like a spray dryer. A purifying liquor consisting of an aqueous solution of sodium carbonate and/or sodium bicarbonate is sprayed into the reaction zone, in which the heat content of the exhaust gases causes virtually all of the water content of the purifying liquor to be evaporated. The exhaust gas is subsequently passed through a filter. Anhydrous solids are withdrawn from the reaction zone and the filter and contain at least 75% of sodium sulfite, sodium sulfate and sodium chloride and are processed to form sodium carbonate. To that end the solids are dissolved and sulfite is oxidized to form sulfate so that a solution that contains sodium sulfate and sodium chloride is formed. The sulfate is separated from that solution and the remaining solution is used in the recovery of sodium carbonate by the Solvay process.

11 Claims, 2 Drawing Figures

METHOD OF AND APPARATUS FOR REMOVING SULFUR OXIDES FROM EXHAUST GASES FORMED BY COMBUSTION

FIELD OF THE INVENTION

My present invention relates to a method of and to an apparatus for reducing the sulfur oxide content of waste gases to be released into the atmosphere and, more particularly, to a method of and to an apparatus for removing sulfur oxide from exhaust gases formed by combustion, especially power plant exhaust gas.

BACKGROUND OF THE INVENTION

It is known that exhaust gases which contain $SO_2$ and $SO_3$ can be scrubbed in a wet process with a sodium carbonate solution. This has been described, e.g. in Opened German Specification No. 2,541,821 and in the periodical "National Engineer," vol. 75 (1971), on pages 6 to 9. In the known processes, the absorbent solution is liquid when it has been used and is not regenerated to form sodium carbonate.

In the aforedescribed wet process, a slurry or sludge is collected which cannot be readily processed and which, moreover, is toxic to the environment when released into basins or the like.

Mention may also be made of the fact that while other scrubbing systems and even systems for disposing of the slurry or sludge obtained by scrubbing have been proposed, they are all fraught with the difficulties which result when solutions, suspensions, sludges or slurries must be handled to prevent environmental contamination. Some of these problems derive from the variable concentrations of the solutions or other components of such liquid materials, the difficulty in recovering any useful components in a sufficiently pure state so as not to require expensive and energy-consuming separation processes, and the need for investing considerable energy in any antipollution treatment of such liquid materials.

Thus, while it is known to spray a combustion exhaust gas containing sulfur oxides with alkaline materials such as sodium carbonate, in solution, the result has invariably been a wet mass fraught with the problems enumerated above.

OBJECTS OF THE INVENTION

It is, therefore, the principal object of the present invention to provide an improved method of removing sulfur oxides from waste gases and especially combustion waste gases whereby the disadvantages enumerated above are eliminated.

Still another object of the invention is to provide an improved apparatus or plant for the removal of sulfur oxide from a combustion exhaust gas, especially a power-plant exhaust gas.

Still another object of this invention is to provide an improved method of treating combustion exhaust gases with improved energy efficiency and overall economy while enabling the treated gas to be released into the atmosphere free from sulfur oxide contaminants.

Still another object of my invention is to eliminate, in an antipollution treatment of electrical power-plant exhaust gases, the need for handling waste materials of variable compositions and utility.

It is an object of the invention to provide a low-cost process which is of the kind described first hereinbefore and in which the products formed by the purification of the exhaust gas can be subjected to further processing in a simple manner.

SUMMARY OF THE INVENTION

This is accomplished in accordance with the invention in that the water content of the purifying liquor is virtually completely evaporated in the reaction zone, virtually anhydrous solids containing at least 75% by weight of sodium sulfite, sodium sulfate and sodium chloride are withdrawn from the reaction zone and from a filter which is flown through by the exhaust gas after the reaction zone, and are dissolved at least in part, sulfite is oxidized to form sulfate in contact with oxygen-containing gas, and sodium carbonate is recovered from the solution which contains sodium sulfate and sodium chloride.

From the foregoing it will be apparent that I have discovered the possibility of spraying into the exhaust gas of an electrical power-plant boiler a solution of sodium carbonate or sodium bicarbonate such that, within a reaction zone traversed by the gas, the temperature, sodium carbonate or bicarbonate concentrations and the rate of spraying of the solution are maintained so that all of the sprayed liquid is evaporated without saturating the gas with water vapor, that the resulting solids contain at least 75% by weight sodium sulfite, sodium sulfate and sodium chloride, and that the gas nevertheless can be released into the atmosphere practically completely free from sulfur oxides while the solids which are recovered are anhydrous, i.e. practically completely dry. The solids are obtained preferably as a flowable powder which is readily worked up in the manner generally described above and more particularly described below, in a convenient manner without any of the disadvantages hitherto encountered in the handling of wet material.

That process affords the advantage that no liquid waste is formed in the purification of the exhaust gas. Such waste would otherwise have to be collected and processed at high cost. Besides, a large part of the chlorides contained in the exhaust gas are collected in the process.

The desired evaporation of the water content of the cleaning liquor in the reaction zone can be accomplished if the exhaust gas entering the reaction zone has a temperature of at least 110° C. The exhaust gas leaving the reaction zone preferably has a temperature of at least 65° C. and is not even saturated with water vapor. For this reason a subsequent heating of the purified gas before it enters the chimney is not required in most cases.

If the exhaust gas has initially a high dust content, the purification preferably begins with a coarse dust-collecting step. The coarse dust-collecting step need not be highly efficient because even exhaust gas which contains 500 mg dust per standard $m^3$ may be contacted with purifying liquor which contains sodium carbonate.

The exhaust gas which has left the reaction zone is passed through a filter, which may consist, e.g. of an electrostatic precipitator or a cloth filter. Where an electrostatic precipitator is used, the exhaust gas leaving the reaction zone preferably contains considerable quantities of water vapor because this will increase the efficiency of the electrostatic precipitator, in which the dust remaining in the exhaust gas after the coarse dust-collecting treatment as well as the solids formed in the reaction zone are precipitated.

Virtually anhydrous solids become available in the reaction zone and in the succeeding filter and contain at least 75% by weight of $Na_2SO_3$, $Na_2SO_4$, and NaCl. These solids contain also sodium carbonate which has not been reacted in the reaction zone. The sodium carbonate content of the solids can amount up to 25% by weight. To ensure utilization also of that sodium carbonate content, solids from the reaction zone and/or the filter may be used directly in the preparation of the purifying liquor. In that case, part of the solids and fresh sodium carbonate are dissolved in water and the resulting purifying liquor is fed to the reaction zone.

An important part of the process is the production of sodium carbonate which can be re-used in the process. The solids which contain $Na_2SO_3$, $Na_2SO_4$ and NaCl are available as starting material for producing sodium carbonate. These solids can be dissolved in water and can then be oxidized with oxygen-containing gas, such as air, which is bubbled through the solution. As a result, sulfite is converted to sulfate.

The addition of a sufficiently large quantity of $CaCl_2$ to the oxidized solution, which contains $Na_2SO_4$, NaCl and sodium carbonate, will cause $CaCO_3$ and $CaCO_4$ to precipitate. When the precipitates have been separated, the residual NaCl solution can be used in a known and technically proved manner to produce sodium carbonate by the known Solvay process, also known as the ammonia-soda process.

The Solvay process can be outlined briefly as follows:

$$NaCl + CO_2 + NH_3 + H_2O \rightarrow NH_4Cl + NaHCO_3$$

The precipitated sodium hydrogen carbonate is heated to 170° to 180° C. in a calcinating oven and is thus converted to calcined sodium carbonate in accordance with the reaction equation $$2\ NaHCO_3 \rightarrow Na_2CO_3 + H_2O + CO_2$$

The $CO_2$ which has been released can be re-used in the process. From the ammonium chloride brine, the ammonia can be recovered by an addition of burnt lime (CaO). As the lime is burnt, the $CO_2$ is recovered which is required in the process. Only NaCl and lime are required for the production of sodium carbonate by the Solvay process. Its end products are the desired sodium carbonate and, owing to the recovery of ammonia, a calcium chloride solution:

$$2\ NH_4Cl + CaO \rightarrow CaCl_2 + 2\ NH_3 + H_2O$$

In addition to sodium carbonate, calcium chloride is also a desirable product in this case and can be used in the preceding process of converting the solids.

Within the scope of the process according to the invention, the Solvay process can be modified in that sodium sulfate is used directly for the recovery of sodium bicarbonte.

$$Na_2SO_4 + 2CO_2 + 2\ H_2O \rightarrow (NH_4)_2SO_4 + 2NaHCO_3$$

Ammonia is recovered in accordance with the equation $$(NH_4)_2SO_4 + CaO \rightarrow CaSO_4 + 2NH_3 + H_2O$$

BRIEF DESCRIPTION OF THE DRAWING

The above and other objects, features and advantages of the present invention will become more readily apparent from the following description, reference being made to the acompanying drawing in which.

SPECIFIC DESCRIPTION

Figure 1:
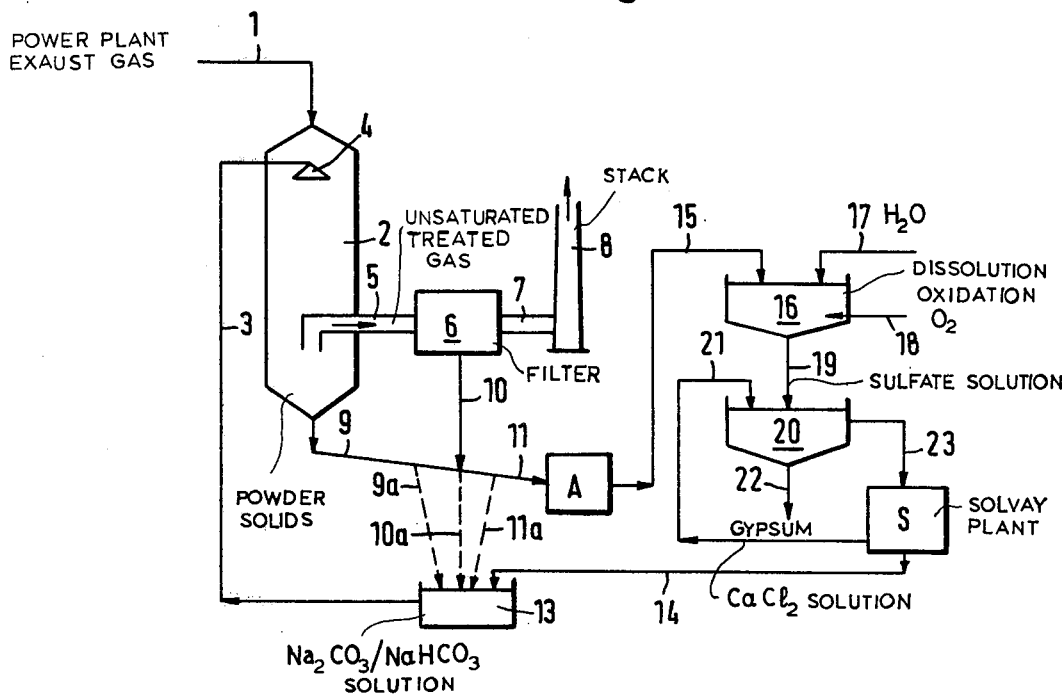
FIG. 1 is a flow diagram of the entire process.

In the process shown in FIG. 1, exhaust gas which contains dust and sulfur oxides and has a temperature of at least 110° C. is fed through a duct 1 into a reaction zone which consists of a spray adsorber 2. The adsorber 2 may be basically similar in design to a spray dryer. A purifying liquor consisting of a sodium carbonate solution is fed through a conduit 3 and a succeeding spray nozzle 4 to the adsorber 2 and is contacted therein with the hot exhaust gas. Exhaust gas at a temperature of at least 65° C. leaves the spray adsorber 2 through duct 5 and is conducted to a filter 6, which may consist, e.g. of a known electrostatiic precipitator installation. The exhaust gas leaves the filter 6 in a duct 7 and is discharged via a chimney or stack 8 into the atmosphere.

The conditions in the spray adsorber 2 are so matched that the hot exhaust gas causes virtually the entire water content of the cleaning liquid to evaporate and to be withdrawn with the exhaust gas. Dry solids consisting mainly of sodium sulfite, sodium sulfate and sodium chloride as well as unconsumed sodium carbonate are formed in the adsorber 2. Part of said solids are collected at the lower end of the adsorber 2 and are withdrawn from it in a duct 9. The solids are entrained in part by the exhaust gas flowing via duct 5 to the filter 6, in which they are removed from the exhaust gas. The flowable powder anhydrous solids are withdrawn from the filter 6 in a duct 10 and together with the solids conducted in duct 9 are fed in a duct 11 to a collecting bin A.

If the solids conducted in ducts 9 and 10 still contain considerable quantities of sodium carbonate, the economy of the process may be improved in that at least part of said solids are fed directly to a supply vessel 13 via ducts 9a, 10 or 11a shown by dotted lines. The supply vessel 13 is used to make the cleaning liquor and is fed with fresh sodium carbonate via a duct 14.

Two variants of a process of recovering the solids in the collecting vessel A in preparation of a recovery of sodium carbonate will now be described with reference to the flow diagram shown in FIG. 1.

In the first variant, the solids are fed via a duct 15 to a vessel 16 and in the latter are dissolved in water supplied via conduit 17. The solution is oxidized with oxygen-containing gas, such as air, which is supplied by a duct 18. By this oxidation, the sulfite is converted to sulfate.

The oxidized solution in a vessel 16 contains mainly $Na_2SO_4$, NaCl and $Na_2CO_3$ and is fed via conduit 19 to the vessel 20, which is used to precipitate gypsum. $CaSO_4$ and $CaCO_3$ precipitated in the vessel 20 are withdrawn via a duct 22 and may be stored, e.g. on a dump. The remaining solution of NaCl is fed in conduit 23 to a Solvay plant S and is processed therein to form sodium carbonate in known manner. A $CaCl_2$ solution becomes available in the Solvay plant S and is supplied via conduit 21 to vessel 20. Sodium carbonate produced in the Solvay plant S is transferred via duct 14 or by suitable transfer equipment to the supply vessel 13 for the purifying liquor.

A second variant of the processing of the solids from the vessel A can also be carried out in the system shown in FIG. 1. In that case, dilute sulfuric acid rather than water is fed in conduit 17 to the vessel 16 so that the residual sodium carbonate is decomposed, $CO_2$ escapes and $Na_2SO_4$ is additionally formed. During that reaction the pH value in the vessel 16 is kept in the range of 5 to 7, preferably at about 6. In that case oxygen for the conversion of sulfite to sulfate must also be supplied via a duct 18. The vessel 20 for precipitating gypsum, is supplied with $CaCl_2$ from duct 21 so that fairly pure $CaSO_4.2H_2O$ is precipitated and then is withdrawn through a duct 22. The gypsum can be processed and be used as a building material. In other respects, the process is carried out with the same details which have been explained with reference to the first variant.

Figure 2:
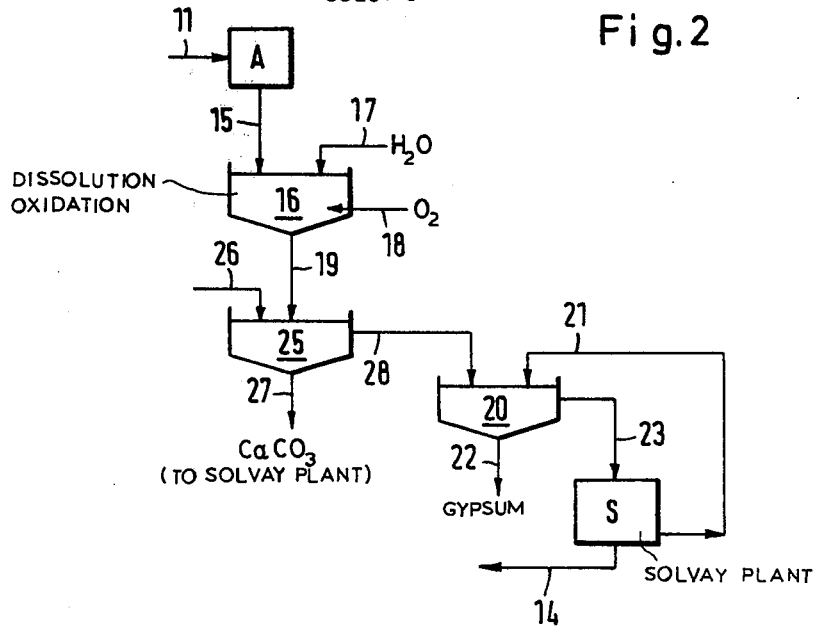
FIG. 2 illustrates a modification of the conversion of the solids formed in the purification of the exhaust gas.

A third variant of the processing solids in the collecting vessel A will be explained with reference to FIG. 2. The solids are fed via duct 15 to the vessel 16, which is fed via conduit 17 with water for dissolving the solids. For an oxidation such as has been explained hereinbefore, oxygen-containing gas is supplied via duct 18.

The solution which contains sodium sulfate, sodium chloride and residual sodium carbonate is supplied in conduit 19 into a vessel 25. A small amount of $CaCl_2$ is added via a duct 26 to the solution in the vessel 25 so that calcium carbonate is precipitated by the reaction $NaCO_3+CaCl_2=CaCO_3+2$ NaCl whereas $Na_2SO_4$ remains in solution. Calcium carbonate is withdrawn from vessel 25 via a duct 27 and can be used in the Solvay plant S.

The solution contained in vessel 25 is substantially free from carbonate and is conducted in conduit 28 to the vessel 20, which is used to precipitate gypsum. The vessel 20 is fed via duct 21 with $CaCl_2$, which causes $CaSO_4$ to precipitate. In other respects, the process is the same as in the variants explained above.

SPECIFIC EXAMPLES

EXAMPLE 1

In a coal-fired power plant, coal which contains 1.2% by weight of sulfur is burned at a rate of 250 metric tons per hour, whereby an exhaust gas becomes available at a temperature of about 140° C. and at a rate of $2.5\times 10^6$ standard m$^3$/h. The exhaust gas is first passed through a first electrostatic precipitator, in which coarse dust is collected at a rate of 25 metric tons per hour. After the removal of coarse dust, the exhaust gas containing 2.4 grams $SO_2$, 0.12 gram chlorides and 0.25 gram dust per standard m$^3$ is treated in a spray adsorber 2, in which the sulfur oxides and chlorides are removed. For the treatment of the entire exhaust gas, the adsorber is fed per hour with 94 metric tons of water, which contains 11,000 kg $Na_2CO_3$. Dust is subsequently collected from the exhaust gas, leaves the electrostatic precipitator in duct 7 and has a temperature of 75° C. It still contains 240 mg $SO_2$, 40 mg chloride and 40 mg dust per standard m$^3$.

Solids consisting of 8505 kg $Na_2SO_3$, 2396 kg $Na_2SO_4$, 327 kg NaCl, 1757 kg $Na_2CO_3$ and 525 kg dust become available per hour in the spray adsorber 2 and the electrostatic precipitator 6 and are collected in vessel A.

These solids are dissolved in $H_2SO_4$, which is supplied at a rate of 1625 kg/h. 1080 kg $O_2$ are supplied to the vessel 16 per hour. Solvent is transferred from the vessel 16 to the vessel 20, which serves to precipitate gypsum and is fed with 11,206 kg/h $CaCl_2$. In the vessel 20, 14,512 kg gypsum derived from sodium sulfate formed by the purification of the exhaust gas and additional 2852 kg gypsum derived from the $H_2SO_4$ added to the vessel 16 are precipitated per hour. The 17,364 kg gypsum which are precipitated per hour contain in addition 525 kg dust, 30 kg soluble salts and about 1500 kg water.

A solution which contains 12,138 kg/h NaCl is supplied via conduit 23 to the Solvay plant S, which 10,380 kg $CaCO_3$ and consumed per hour to produce 11,000 kg/h $Na_2CO_3$ for re-use in the spray adsorber 2.

EXAMPLE 2

Dust and sulfur are collected as in Example 1 and solids at the same ratee become available in the vessel A. These solids from the vessel A are dissolved in water in a process shown in FIG. 2. 1080 kg/h $O_2$ are used for oxidizing in the vessel 16. The resulting solution is fed with 1760 kg/h $CaCl_2$ in the vessel 25, which serves to precipitate lime. 1585 kg/h $CaCO_3$ are thus precipitated and are withdrawn for use in the Solvay plant S.

In the vessel 20 used to precipitate gypsum, 9446 kg/h $CaCl_2$ are added to the solution which has been withdrawn from vessel 25. This results in the precipitation of 14,512 kg/h $CaSO_4.2H_2O$ and of 73 kg/h $CaCO_3$. These precipitates are separated. A solution composed like that used in Example 1 is fed in conduit 23 to the Solvay plant S. In other respects, the process is also carried out as in Example 1.

I claim:

1. A method of removing sulfur oxides from a combustion-process exhaust gas which comprises the steps of:
   (a) said exhaust gas, which also contains chloride impurities, is fed at a temperature of at least 110° C. into a reaction zone;
   (b) spraying into the exhaust gas traversing said zone an aqueous cleaning solution of a compound selected from the group which consists of sodium carbonate and sodium bicarbonate;
   (c) maintaining in said zone a temperature of said exhaust gas, a rate of spraying of said aqueous cleaning solution and a concentration of said compound in said aqueous cleaning solution such that the sprayed aqueous cleaning solution is substantially completely evaporated in said zone, and solids are formed which withdraw the sulfur oxides from the exhaust gas;
   (d) filtering said solids from the gas and recovering the filtered solids in a substantially anhydrous state with at least 75% by weight of the solids consisting of sodium sulfite, sodium sulfate and sodium chloride;
   (e) dissolving the solids recovered in step (d) in water or dilute sulfuric acid;
   (f) oxidizing the sulfite in the solution produced in step (e) with an oxygen-containing gas to form sulfate to produce a sulfite-free solution;
   (g) mixing the sulfite-free solution with a calcium chloride solution obtained from a SOLVAY process;
   (h) precipitating and withdrawing calcium sulfate from the mixture and leaving behind a sodium chloride solution; and
   (i) subjecting said sodium chloride solution to said SOLVAY process to produce sodium carbonate or sodium bicarbonate to be recycled into said aqueous cleaning solution sprayed during step (b) and to produce calcium chloride to be recycled to step (g).

2. The method defined in claim 1 wherein the exhaust gas is introduced into the reaction zone in step (a) at a temperature of at least 110° C.

3. The method defined in claim 1 wherein solids formed by treating said exhaust gas in steps (b) and (c) are dissolved in water and used as the solution during step (e).

4. The method defined in claim 1, further comprising the step of subjecting the exhaust gas prior to introduction into the reaction zone in step (a) to a preliminary coarse separation of particulates therefrom.

5. The method defined in claim 1 wherein the exhaust gas is led from the reaction zone following step (c) at a temperature of at least 65° C.

6. The process defined in claim 1 wherein the solids are dissolved in dilute sulfuric acid at a pH of 5 to 7 in step (e) and wherein pure calcium sulfate is precipitated during step (h).

7. A method of removing sulfur oxides from a combustion-process exhaust gas which comprises the steps of:
  (a) said exhaust gas, which also contains chloride impurities, is fed at a temperature of at least 110° C. into a reaction zone;
  (b) spraying into the exhaust gas traversing said zone an aqueous cleaning solution of a compound selected from the group which consists of sodium carbonate and sodium bicarbonate;
  (c) maintaining in said zone a temperature of said exhaust gas, a rate of spraying of said cleaning solution and a concentration of said compound in said aqueous cleaning solution such that the sprayed aqueous cleaning solution is substantially completely evaporated in said zone, and solids are formed which withdraw the sulfur oxides from the exhaust gas.
  (d) filtering said solids from the gas and recovering the filtered solids in a substantially anhydrous state with at least 75% by weight of the solids consisting of sodium sulfite, sodium sulfate and sodium chloride and also containing residual sodium carbonate;
  (e) dissolving the solids recovered in step (d) in water;
  (f) oxidizing the sulfite in the solution produced in step (e) with an oxygen-containing gas to form sulfate to produce a sulfite-free solution;
  (g) mixing the sulfite-free solution containing residual sodium carbonate with a small amount of calcium chloride from a SOLVAY process and sufficient to precipitate calcium carbonate and recovering the calcium carbonate precipitate;
  (h) adding additional calcium chloride from the SOLVAY process to precipitate and to withdraw calcium sulfate from the mixture to leave behind a sodium chloride solution; and
  (i) employing the sodium chloride solution and the calcium carbonate precipitate in the SOLVAY process to produce sodium carbonate or sodium bicarbonate to be recycled into said aqueous cleaning solution sprayed during step (b) and to produce calcium chloride to be recycled to steps (g) and (h).

8. The method defined in claim 7 wherein the exhaust gas is introduced into the reaction zone in step (a) at a temperature of at least 110° C.

9. The method defined in claim 7 wherein solids formed by said exhaust gas in steps (b) and (c) are dissolved in water and used as the solution during step (e).

10. The method defined in claim 7, further comprising the steps of subjecting the exhaust gas prior to introduction into the reaction zone in step (a) to a preliminary coarse separation of particulates therefrom.

11. The method defined in claim 7 wherein the exhaust gas is led from the reaction zone following step (c) at a temperature of at least 65° C.

* * * * *